April 10, 1928.  1,665,389
V. WILLOUGHBY
BRAKE ROD JAW
Filed Oct. 23, 1923
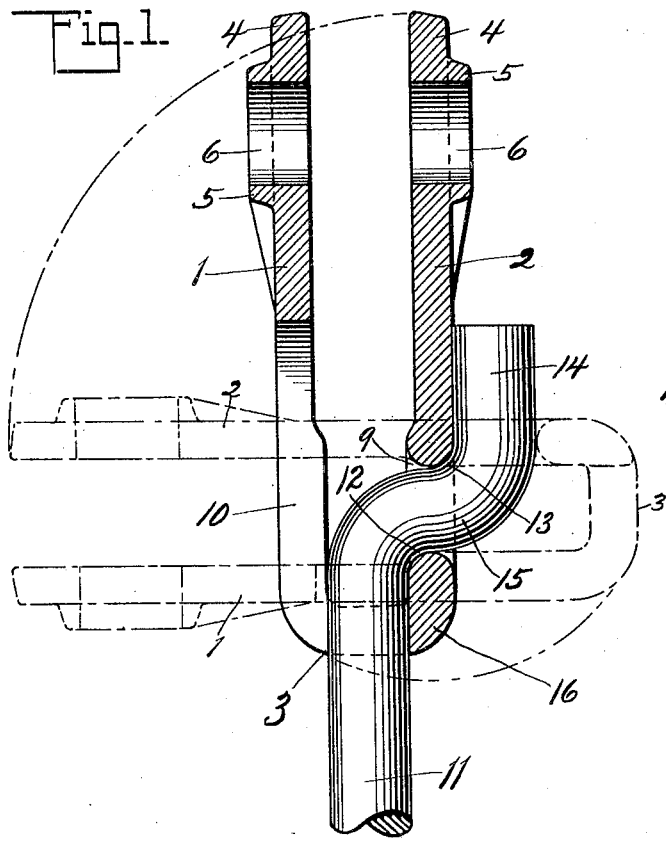
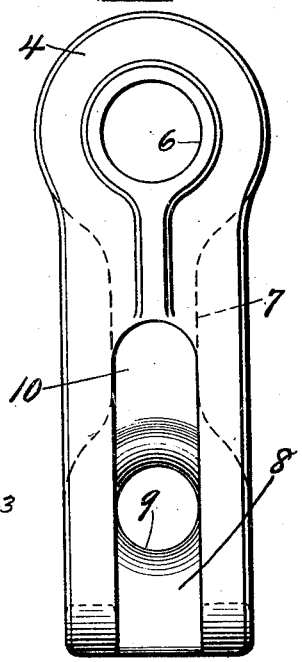
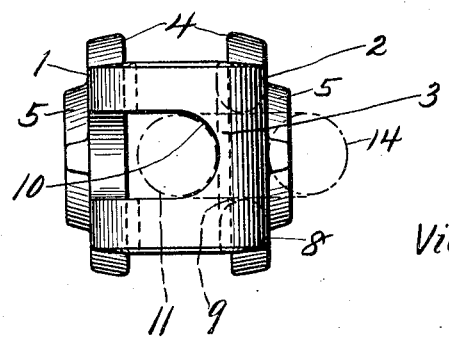
INVENTOR:
Victor Willoughby
BY F. H. Gibbs
ATTORNEY.

Patented Apr. 10, 1928.

1,665,389

UNITED STATES PATENT OFFICE.

VICTOR WILLOUGHBY, OF RIDGEWOOD, NEW JERSEY, ASSIGNOR TO AMERICAN CAR AND FOUNDRY COMPANY, OF NEW YORK, N. Y., A CORPORATION OF NEW JERSEY.

BRAKE-ROD JAW.

Application filed October 23, 1923. Serial No. 670,294.

It is an object of this invention to provide an improved brake rod jaw formed of a unitary bent member and which may be readily applied and removed when used with a brake rod having a head formed of an offset portion of the rod.

The accompanying drawings illustrate the preferred form of the invention, though it is to be understood that the invention is not limited to the exact details of construction shown and described, as it is obvious that various modifications thereof within the scope of the claims will occur to persons skilled in the art.

In said drawings:

Fig. 1 is a central longitudinal section of a brake rod jaw constructed in accordance with this invention and shown applied to a brake rod.

Fig. 2 is an elevation of the brake rod jaw shown detached from the brake rod and looking from the left side in Fig. 1; and Fig. 3 is a bottom plan view of the brake rod jaw shown in Fig. 2.

As shown in the drawings this device comprises a unitary member of U-shape having the legs 1 and 2 joined by a cross piece 3, the member being formed either by casting or by forging and bending to the desired shape.

The free end of the jaw is open, and its legs 1 and 2 are each formed with circular ends 4 having bosses 5 provided with openings 6 to receive the pin which secures the jaw to the brake lever (not shown). The leg 2 is of reduced area, as at 7, for a portion of its length but is enlarged as at 8 and provided with an opening 9 having rounded edges to receive the brake rod 11. The leg 1 is of substantially the same area throughout its length and is provided with a slot 10 which extends for the greater portion of the length of the leg 1 and the length of the cross piece 3.

The brake rod 11 is bent at right angles as at 12 and is again bent at right angles as at 13 providing a portion 14 offset from the main body of the rod 11 and parallel thereto, and a portion 15 connecting the offset portion 14 to the body of the rod 11.

In assembling this device the jaw will be placed in the position shown in dotted lines in Fig. 1 with the brake rod 11 passing through the slot 10 and the offset portion 14 extending through the opening 9 and the jaw will then be rotated in a clockwise direction as shown in Fig. 1 bringing the offset portion 14 into engagement with the outside of the leg 2, the portion 15 in the opening 9 and bringing the portion 16 of the leg 2 which is below the opening 9 into engagement with the main body of the rod 11. Thus the extremity 14 of the rod 11 does not trench on the space between the jaw legs 1, 2, but, on the contrary, leaves it free to accommodate the brake lever to which the jaw is connected in service. It will be noted that with the brake rod 11 in engagement with the jaw as shown in Fig. 1, the jaw can not become detached from the brake rod 11 as long as the jaw is connected to a brake lever by a pin in the openings 6 but may be readily detached from the brake rod when disconnected from the brake lever.

What is claimed is:

1. In combination, a brake rod jaw comprising a unitary open-ended U shaped member with an opening in one leg to receive the end of a brake rod and a slot in the other leg to permit insertion of the brake rod in the opening of the first leg; and a brake rod with a rigid offset extremity parallel to the body of the rod and engaged in the opening of the first leg, but leaving the space between the legs free to accommodate the member to which the jaw is to be connected in service.

2. A brake rod jaw of U-shape having an opening in one leg to receive the brake rod, a slot extending from said first leg into the second leg to permit insertion of the brake rod in the opening in said first leg, and a rigid brake rod having an end thereon offset and parallel to the body portion of the brake rod, said rod being detachably connected to the jaw with the body portion of the rod and the end thereof positioned on opposite sides of said first leg.

3. A brake rod jaw comprising a unitary bent U-shaped member having an opening in one leg to receive a brake rod and slotted for the greater part of the other leg to permit insertion of the brake rod in the opening in the first leg, and a rigid brake rod having an end thereon offset and substantially parallel to the center line of the brake rod, said rod being detachably connected to the U-shaped member.

4. In combination, a rigid brake rod having an end thereon offset from and parallel to the body portion of the rod and a jaw comprisng a unitary member having spaced legs, one of said legs having an opening to receive the offset end of said brake rod, and a slot extending from said first leg into the second leg to permit insertion of the offset end of the brake rod in the opening of said first leg.

5. A brake rod jaw of U-shape having an opening in one leg to receive the brake rod and a slot in the other leg to permit insertion of the brake rod in the opening in said first leg and a rigid brake rod adapted to engage one side of said first leg and having a fixed end thereon adapted to engage the other side of said first leg.

6. An open-ended brake rod jaw comprising a member having spaced legs provided with openings, and a brake rod passing through the opening in one leg and having a rigid offset end engaged with the opening in the other leg and extended parallel to the latter exteriorly of the same and thereby leaving the space between the legs unobstructed to accommodate the member to which the jaw is to be connected in service.

7. In a device of the character described, a brake rod jaw comprising spaced legs connected by an intermediate portion, and a brake rod passing through the intermediate portion and one leg with its extremity extending parallel to the legs.

8. In a device of the character described, a U-shaped brake rod jaw having right angularly disposed openings at one end thereof, and a brake rod having a Z-shaped end portion engaged with the openings with one leg thereof lying exteriorly of the brake rod jaw.

9. In a device of the character described, a U-shaped member provided with registering openings adapted to receive a pin passing through a brake lever positioned between the legs of the U-shaped member and also having a U-shaped opening in which the brake lever is movable, the crest and one leg of the U-shaped member having a continuous slot extending the length of the crest and a substantial distance of said leg, the other leg of the U-shaped member having an opening disposed at right angles to the crest and a brake rod extended through the slot and opening and having an offset end engageable with the U-shaped member.

In witness whereof I have hereunto set my hand.

VICTOR WILLOUGHBY.